United States Patent
Abe et al.

(10) Patent No.: US 11,441,449 B2
(45) Date of Patent: Sep. 13, 2022

(54) HEAT RETENTION DEVICE FOR TURBINE CASING, SECURING TOOL FOR SECURING HEAT RETENTION BLOCK FOR TURBINE CASING, AND METHOD FOR SECURING HEAT RETENTION BLOCK FOR TURBINE CASING

(71) Applicant: Mitsubishi Hitachi Power Systems, Ltd., Kanagawa (JP)

(72) Inventors: Hyota Abe, Yokohama (JP); Yuji Kurokawa, Yokohama (JP); Takuya Izumi, Yokohama (JP); Takeshi Nakao, Nagasaki (JP); Keisuke Ide, Nagasaki (JP); Osamu Koga, Nagasaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 279 days.

(21) Appl. No.: 16/606,025

(22) PCT Filed: May 11, 2018

(86) PCT No.: PCT/JP2018/018327
§ 371 (c)(1),
(2) Date: Oct. 17, 2019

(87) PCT Pub. No.: WO2018/207913
PCT Pub. Date: Nov. 15, 2018

(65) Prior Publication Data
US 2021/0277798 A1    Sep. 9, 2021

(30) Foreign Application Priority Data
May 11, 2017    (JP) .............................. JP2017-094451

(51) Int. Cl.
*F01D 25/14* (2006.01)

(52) U.S. Cl.
CPC ........ *F01D 25/145* (2013.01); *F05D 2220/30* (2013.01); *F05D 2230/51* (2013.01); *F05D 2230/60* (2013.01)

(58) Field of Classification Search
CPC ......... F01D 25/145; F01D 25/24; F16B 21/04
See application file for complete search history.

(56) References Cited

U.S. PATENT DOCUMENTS

| 4,018,023 A | 4/1977 | Anderson |
| 4,661,009 A * | 4/1987 | Tripp ................... B24B 45/006 |
| | | 279/157 |

(Continued)

FOREIGN PATENT DOCUMENTS

JP    5836155    12/2015

OTHER PUBLICATIONS

Search Report dated Jul. 17, 2018 in International (PCT) Application PCT/JP2018/018327, with English-language translation.

(Continued)

*Primary Examiner* — Woody A Lee, Jr.
*Assistant Examiner* — Cameron A Corday
(74) *Attorney, Agent, or Firm* — Wenderoth, Lind & Ponack, L.L.P.

(57) ABSTRACT

A securing tool for a heat retention block covering a turbine casing main body includes: a securing rod, one end of which has an engaging portion with a protrusion; and a socket. The socket includes a guide groove, into which the protrusion of the securing rod is inserted, and a recessed groove. The guide groove includes a first guide groove, which extends in the socket axis direction from a starting end to a terminal end, and a second guide groove, the starting end of which is connected to the terminal end, and which extends from the starting end to a terminal end in a circumferential direction (Continued)

relative to the socket axis. The second guide groove is connected to the recessed groove.

4 Claims, 7 Drawing Sheets

(56) References Cited

U.S. PATENT DOCUMENTS

| | | | | |
|---|---|---|---|---|
| 4,952,440 | A * | 8/1990 | Sanmartin | F16L 59/029 428/116 |
| 6,071,035 | A * | 6/2000 | McKelvy | B25F 3/00 403/320 |
| 6,379,076 | B1 * | 4/2002 | Reinhold | F16B 21/04 403/348 |
| 8,613,589 | B2 * | 12/2013 | Yamashita | F01D 9/026 415/134 |
| 2004/0109758 | A1 * | 6/2004 | Doody | F01D 25/243 415/177 |
| 2011/0150717 | A1 * | 6/2011 | Kumar | F01N 3/2857 422/177 |
| 2015/0337686 | A1 | 11/2015 | Bracquemart et al. | |

OTHER PUBLICATIONS

Written Opinion dated Jul. 17, 2018 in International (PCT) Application No. PCT/JP2018/018327, with English-language translation.

\* cited by examiner

HEAT RETENTION DEVICE FOR TURBINE CASING, SECURING TOOL FOR SECURING HEAT RETENTION BLOCK FOR TURBINE CASING, AND METHOD FOR SECURING HEAT RETENTION BLOCK FOR TURBINE CASING

TECHNICAL FIELD

The present invention relates to a heat retention device for a turbine casing, a securing tool for securing a heat retention block for a turbine casing, and a method for securing a heat retention block for a turbine casing.

The present application claims priority based on JP 2017-094451 filed in Japan on May 11, 2017, the contents of which are incorporated herein by reference.

BACKGROUND ART

In general, a turbine casing of a steam turbine or a gas turbine (hereinafter collectively referred to as "turbine power generator") used in a power plant, chemical plant, or the like, is configured by dividing the turbine casing with the center axis of a rotating portion such as a rotor into two sections above and below. The top and bottom casings are fastened together by bolts at respective flanges. A stationary part such as a stator blade is provided on the inner surface of the turbine casing. A rotating portion, such as a rotor having a rotor blade attached thereto, is mounted horizontally inside the turbine casing. The rotating portion is rotatably supported by a bearing provided on the turbine casing.

Here, during operation of a turbine or the like, high-temperature, high-pressure fluid such as gas, or the like flows inside the turbine casing. At this time, the narrower a clearance between a stationary system and a rotating system, the less fluid is leaked, and more energy can be transmitted to the rotating system. An outer surface of the turbine casing is normally covered by a heat retention block made of a heat insulating material, for preventing heat dissipation.

A structure, for example, illustrated in FIG. 4A is known as an installation structure for such a heat retention block in a turbine casing. Specifically, a plurality of cotton heat insulating material 102 and a plurality of heat retention blocks 103 are alternately laminated on the surface of the turbine casing 101. Stud bolts 104 are inserted into each of the plurality of insertion holes 105 formed in the plurality of heat insulating materials 102 and the plurality of heat retention blocks 103, and the plurality of heat insulating materials 102 and the plurality of heat retention blocks 103 are secured to the turbine casing 101.

Incidentally, in the turbine generator, the casing is opened during a periodic inspection operation. Therefore, it is necessary to attach and detach the heat retention block from the turbine casing at each time. Therefore, it is desirable that the installation structure of the heat retention block on the turbine casing be a structure that can easily perform the attachment and detachment operation. However, in the securing structure of the heat retention block to the turbine casing illustrated in FIG. 4A, the heat insulating material 102 and the heat retention block 103 need to be laminated in multiple layers. This leads a large number of operation steps, and therefore a large number of installation steps are required.

In response to such problems, the present inventors have proposed a heat retention structure for a turbine casing that can be easily and quickly constructed, which can reduce the construction period and reduce the maintenance cost (Patent Document 1).

Specifically, as illustrated in FIG. 4B, the structure includes a net-like member 203 disposed on a surface of a turbine casing, a heat retention block 201 disposed covering the surface, and a belt 205. A part of the belt 205 is inserted into a through hole 202 provided so as to penetrate through the turbine heat retention block 201 in the thickness direction. A hook 204 is provided on an end portion of a part of the belt 205 that is inserted into the through hole 202. The net-like member 203 is locked in the hook 204.

CITATION LIST

Patent Document

Patent Document 1: JP 5836155 B

SUMMARY OF INVENTION

Technical Problem

In the heat retention structure for the turbine casing disclosed in Patent Document 1, the construction can be performed as a part of the belt is passed through the through hole of the heat retention block, the hook provided on one end of the belt is hooked to a predetermined location on the network member, and the heat retention block is pressed downward (on the side of the net-like member) while the other end of the belt is pulled upward. Therefore, according to the heat retention structure for the turbine casing disclosed in Patent Document 1, a worker can easily and quickly work for construction, and it is possible to reduce the construction period and reduce the maintenance cost.

On the other hand, in the heat retention structure for the turbine casing disclosed in Patent Document 1, the heat retention block is not adhered to the turbine casing and sufficient heat retention effect cannot be obtained depending on the tightness due to tightening and securing by a fabric belt.

In particular, in the turbine casing, a force acts on the heat retention block attached to the lower casing vertically downward due to gravity (a direction where the heat retention block is moved away from the turbine casing), so it is not possible to secure the adhesion of the heat retention block to the turbine casing without a significant degree of tightening of the belt by repeating attachment and detachment of the heat retention block.

Furthermore, while the securing of the belt is performed by adhering the fabric tape provided at the belt end to the fabric tape attached to the surface of the heat retention block, there is also a concern that the securing strength falls due to the fabric tape deteriorating and the adhesive force weakening.

The present invention has been proposed in view of the above, and an object of the present invention is to provide a heat retention device for a turbine casing, a securing tool for securing a heat retention block for a turbine casing, and a method for securing a heat retention block for a turbine casing that can be easily and quickly installed to and removed from a turbine casing of a turbine power generator used in a power plant or the like and can be used repeatedly.

Solution to Problem

In order to achieve the above-described object, a heat retention device for a turbine casing according to the present invention includes a heat retention block disposed on a surface of a turbine casing main body, a securing rod capable of penetrating the heat retention block in a thickness direction, and a socket secured to the surface of the turbine casing main body. The heat retention block includes a bag body including an insertion hole formed in a predetermined position and inorganic fiber filled into the bag body. The securing rod includes a rod-shaped main body portion inserted into the heat retention block from the insertion hole and penetrating the heat retention block in a thickness direction, and an engaging portion including a pair of protrusions formed on a first end of the main body portion and protruding outward in a radial direction with respect to the rod-shaped main body portion. The socket has a hollow cylindrical shape centered on a socket axis, and an end of a first side in an axial direction where the socket axis extends forms an open end. The socket includes a first guide groove, a second guide groove, and a recessed groove recessed from an inner circumferential surface of the socket toward an outer circumferential side and formed for receiving the protrusion. The first guide groove includes a first starting end in the open end and a first terminal end, and extends in an axial direction from the first starting end to the first terminal end. The second guide groove includes a second starting end leading to the first terminal end and a second terminal end, and extends in a circumferential direction with respect to the socket axis from the second starting end to the second terminal end. The recessed groove leads to the second terminal end and extends in the axial direction from the second terminal end.

The present aspect includes a heat retention block that is filled with inorganic fiber into a bag body including an insertion hole formed in a predetermined position, and is disposed on a surface of a turbine casing main body. With this configuration, heat dissipation from the turbine casing main body can be efficiently prevented by the inorganic fiber. Thus, according to the present aspect, it is possible to increase the heat retention performance of the turbine casing main body.

The present aspect includes a securing rod including an engaging portion including a pair of protrusions. With this configuration, the securing rod is inserted into a protective block from an insertion hole, and the securing rod and the socket are engaged, making it possible to firmly secure the heat retention block to the surface of the turbine casing main body.

A first guide groove extending in the axial direction from the first starting end in the open end to the first terminal end is formed on the inner circumferential surface of the socket of the present aspect. With this configuration, a protrusion of the securing rod can be guided in the axial direction by inserting the protrusion from the first starting end into the first guide groove and moving from the first starting end to the first terminal end.

On the inner circumferential surface of the socket of the present aspect, a second guide groove is formed that extends in the circumferential direction from the second starting end leading to the first terminal end, to the second terminal end. With this configuration, a protrusion of the first guide groove can be guided in the circumferential direction by inserting the protrusion from the second starting end into the second guide groove and moving the protrusion from the second starting end to the second terminal end.

On the inner circumferential surface of the socket of the present aspect, a recessed groove is formed that leads to the second terminal end and extends in the axial direction. With this configuration, the protrusion of the securing rod is engaged with the recessed groove by inserting a protrusion of the second guide groove into the recessed groove and moving in the axial direction. Thus, in the present aspect, the securing rod can be locked to the socket, and the securing rod and the socket are firmly secured.

In the present aspect, the socket is disposed on the surface of the turbine casing main body. With this configuration, when the heat retention block is installed on the surface of the turbine casing main body, the heat retention block can be installed with reference to the socket as a sign. Thus, in the present aspect, positioning of the heat retention block in the turbine casing main body is facilitated.

In a case where the recessed groove extends from the second terminal end toward the turbine casing main body side in the axial direction, the protrusion can be engaged with the recessed groove by a simple pressing operation of the securing rod toward the turbine casing main body side, and the securing rod can be locked to the socket.

In a case where the recessed groove extends from the second terminal end to the open end side of the socket in the axial direction, the protrusion can be engaged with the recessed groove by a simple pulling operation of the securing rod to the open end side, and the securing rod can be locked to the socket.

Here, in the above-described aspects, a flange may be provided that can be inserted into the main body portion of the securing rod and press the heat retention block toward the turbine casing main body side. In this aspect, in a state in which the securing rod is inserted into the heat retention block for the turbine casing, the flange can be pressed from the surface of the heat retention block, so the securing of the heat retention block to the turbine casing main body becomes robust.

In an aspect having a flange, a male thread may be formed on the main body portion of the securing rod, and a nut that secures the flange at a predetermined position of the main body portion may be screwed into the main body portion. In this aspect, the movement of the flange can be restricted by the nut, and thus securing of the heat retention block to the turbine casing main body is robust.

In any of the above aspects, the heat retention block includes a first heat retention block that covers a surface of the turbine casing main body, and a second heat retention block that is laminated via a plate-shaped reinforcing member in a thickness direction of the first heat retention block. The first heat retention block includes a first bag body having an insertion hole formed in a predetermined position and inorganic fiber filled into the first bag body. The second heat retention block includes a second bag body having an insertion hole formed in a predetermined position and inorganic fiber filled into the second bag body. In this aspect, various methods of use are possible, such as changing the material as inorganic fiber in the first heat retention block and the second heat retention block. For example, as the first inorganic fiber that constitutes the first heat retention block that covers the surface of the turbine casing main body, biosoluble fiber having a high heat retention effect are used. On the other hand, as the second inorganic fiber that constitutes the second heat retention block, rock wool with inferior heat retention effect and low raw material cost can be used to balance heat retention and cost.

In a case where the first heat retention block and the second heat retention block are laminated via the plate-shaped reinforcing members, shear deformation of the first heat retention block and the second heat retention block can be prevented, and the laminated state can be maintained for a long period of time.

In a case where biosoluble fiber is filled in the first bag body as the inorganic fiber, heat retention can be further increased.

In a case where rock wool is filled in the second bag as the inorganic fiber, heat retention can be maintained, while raw material cost can be reduced to a low amount.

In a case where the reinforcing member is expanded metal or punched metal, shear deformation of the first heat retention block and the second heat retention block can be reliably prevented.

In order to achieve the above-described object, a securing tool for securing a heat retention block for a turbine casing according to the present invention includes a securing rod and a socket having a hollow cylindrical shape centered on a socket axis and having an open end at an end on a first side in an axial direction where the socket axis extends. The securing rod includes a main body portion that forms a rod shape and includes male thread formed, an engaging portion including a pair of protrusions formed on a first end of the main body portion and protruding outward in a radial direction with respect to the main body portion having a rod shape, a flange insertable into the main body portion, and a nut screwed into the main body portion so as to secure the flange at a predetermined position on the main body portion. The socket includes a first guide groove, a second guide groove, and a recessed groove recessed from an inner circumferential surface of the socket toward an outer circumferential side and formed for receiving the protrusion. The first guide groove includes a first starting end in the open end and a first terminal end, and extends in an axial direction from the first starting end to the first terminal end. The second guide groove includes a second starting end leading to the first terminal end and a second terminal end, and extends in a circumferential direction with respect to the socket axis from the second starting end to the second terminal end. The recessed groove leads to the second terminal end and extends in the axial direction from the second terminal end.

The present aspect includes a securing rod having an engaging portion including a pair of protrusions. With this configuration, the securing rod and the socket described below can be engaged to be undetachable.

The present aspect includes a flange that can be inserted into the main body portion of the securing rod, and a nut that can be engaged with a male thread formed on the main body portion. With this configuration, for example, in a state in which the securing rod is inserted into the heat retention block for the turbine casing, the flange can be pressed from the surface of the heat retention block, and the flange can be secured at a predetermined position on the securing rod. Thus, according to the present aspect, the heat retention block can be rigidly attached to the turbine casing main body.

A first guide groove extending in the axial direction from the first starting end in the open end to the first terminal end is formed on the inner circumferential surface of the socket of the present aspect. With this configuration, a protrusion of the securing rod can be guided in the axial direction by inserting the protrusion from the first starting end into the first guide groove and moving from the first starting end to the first terminal end.

On the inner circumferential surface of the socket of the present aspect, a second guide groove is formed that extends in the circumferential direction from the second starting end leading to the first terminal end, to the second terminal end. With this configuration, a protrusion of the first guide groove can be guided in the circumferential direction by inserting the protrusion from the second starting end into the second guide groove and moving the protrusion from the second starting end to the second terminal end.

On the inner circumferential surface of the socket of the present aspect, a recessed groove is formed that leads to the second terminal end and extends in the axial direction. With this configuration, the protrusion of the securing rod is engaged with the recessed groove by inserting a protrusion of the second guide groove into the recessed groove and moving in the axial direction. Thus, in the present aspect, the securing rod can be locked to the socket, and the securing rod and the socket are firmly secured.

In order to achieve the above-described object, a method for securing a heat retention block for a turbine casing according to the present invention includes the steps of installing a heat retention block on a turbine casing main body, adjusting a position of the heat retention block with respect to a socket disposed on a surface of the turbine casing main body, the socket having a hollow cylindrical shape centered on a socket axis, and the socket including an open end at an end on a first side in an axial direction where the socket axis extends, penetrating a securing rod including an engaging portion through the heat retention block, pressing the securing rod to fit the engaging portion within the socket, rotating the securing rod in a circumferential direction with respect to the socket axis, and engaging the engaging portion with the socket. The heat retention block includes a bag body including an insertion hole formed in a predetermined position and inorganic fiber filled into the bag, and has a thickness from one surface side to another surface side. The securing rod includes a rod-shaped main body portion, and the engaging portion including a pair of protrusions formed on a first end of the main body portion and protruding outward in a radial direction with respect to the rod-shaped main body portion. The socket includes a first guide groove, a second guide groove, and a recessed groove recessed from an inner circumferential surface of the socket toward an outer circumferential side and formed so that the protrusion is inserted. The first guide groove includes a first starting end in the open end and a first terminal end, and extends in an axial direction from the first starting end to the first terminal end. The second guide groove includes a second starting end leading to the first terminal end and a second terminal end, and extends in a circumferential direction with respect to the socket axis from the second starting end to the second terminal end. The recessed groove leads to the second terminal end and extends in the axial direction from the second terminal end. In the step of installing, the other surface side of the heat retention block is brought into contact with a surface of the turbine casing main body. In the step of adjusting, the position of the heat retention block is adjusted to fit the socket into an insertion hole formed at a predetermined position on the other surface side of the heat retention block. In the step of pressing, the protrusion is inserted into the first guide groove from the first starting end of the first guide groove, and the securing rod is pressed to the first terminal end of the first guide groove. In the step of rotating, the protrusion in the first guide groove is inserted into the second guide groove from the second starting end of the second guide groove, and the securing rod is rotated in the circumferential direction to the second terminal end of the second guide groove. In the step of engaging, the protrusion in the second guide groove is placed in the recessed groove.

In the present aspect, the step of installing is performed. With this method, the heat retention block can be installed on the surface of the turbine casing main body.

In the present aspect, the step of positioning is performed. With this method, the heat retention block can be adjusted to the appropriate position.

In this aspect, the step of penetrating is performed. With this method, the securing rod can be penetrated through the heat retention block. At this time, the insertion hole of the heat retention block is positioned to the socket, and thus the engaging portion of the securing rod that penetrates the heat retention block enters the socket from the open end of the socket, and the securing rod can be temporarily secured.

In the present aspect, the step of pressing is performed. With this method, the protrusion of the securing rod can be guided in the axial direction in the socket by a simple pressing operation.

In this aspect, the step of rotating is performed. With this method, the protrusion of the securing rod can be guided in the circumferential direction in the socket by a rotation operation.

In this aspect, the step of engaging is performed. With this method, the securing rod can be locked to the socket by inserting the protrusion of the securing rod into the recessed groove from the second terminal end position of the second guide groove, and thus the securing rod and the socket are firmly secured.

In a case where the step of engaging includes a step of pressing the securing rod from the second terminal end, the securing rod can be locked to the socket by inserting the protrusion of the securing rod in the recessed groove by a simple pressing operation, so the securing rod and the socket are firmly secured.

In a case where the step of engaging includes a step of pulling the securing rod from the second terminal end, the securing rod can be locked to the socket by inserting the protrusion of the securing rod in the recessed groove by a simple pulling operation, so the securing rod and the socket are firmly secured.

Advantageous Effect of Invention

In one aspect of the present invention, the heat retention device can be installed easily and quickly on the turbine casing, and the heat retention device can be used repeatedly.

DESCRIPTION OF EMBODIMENTS

Embodiments of the present invention relating to a heat retention device for a turbine casing, a securing tool for securing a heat retention block for a turbine casing, and a method for securing a heat retention block for a turbine casing will be described with reference to the drawings.

Figure 1:
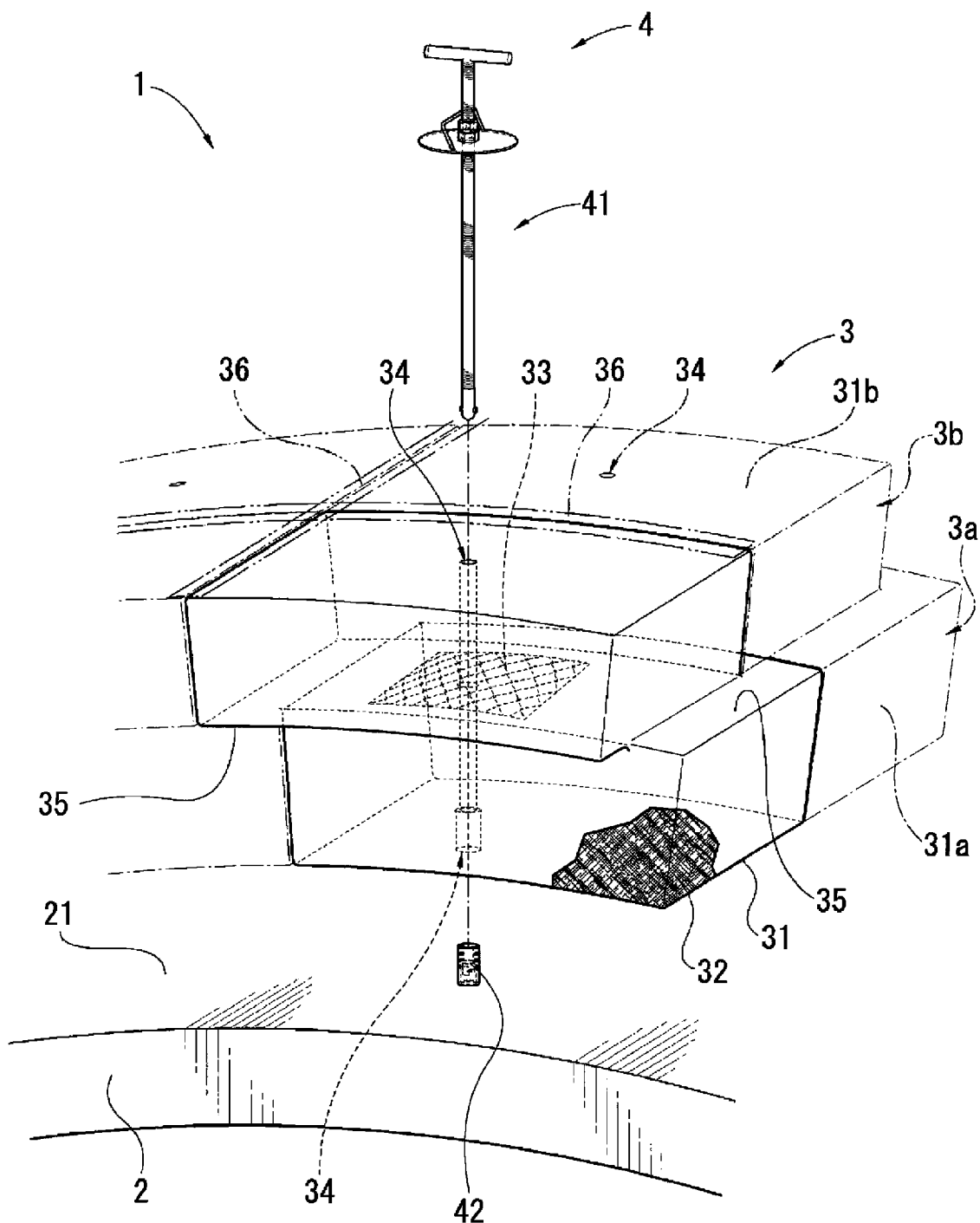
FIG. 1 is an entire external view of a heat retention device according to an embodiment of the present invention.

A heat retention device for a turbine casing according to the present embodiment will be described using FIG. 1. As illustrated in FIG. 1, for example, a heat retention device 1 for a turbine casing covers a surface 21 of a turbine casing main body 2 of a turbine power generator used in a power plant or the like to retain heat of the turbine casing main body 2. The heat retention device 1 includes a heat retention block 3 and a securing tool 4 for securing the heat retention block 3 to the surface 21 of the turbine casing main body 2.

The heat retention block 3 includes a first heat retention block 3a that directly covers the surface 21 of the turbine casing main body 2, and a plate-shaped reinforcing member 33 disposed on the first heat retention block 3a, a plate-shaped reinforcing member 33 disposed on the first heat retention block 3a, and a second heat retention block 3b laminated on the first heat retention block 3a in the thickness direction via the reinforcing member 33. The first heat retention block 3a and the second heat retention block 3b are block shaped heat insulating material, and the first heat retention block 3a and the second heat retention block 3b are sewed and integrated. The first heat retention block 3a includes a first bag body 31a made of glass cloth and inorganic fiber 32 selected from locking wool, biosoluble fiber, or the like filled therein. The second heat retention block 3b includes a second bag body 31b made of glass cloth and inorganic fiber 32 selected from locking wool, biosoluble fiber, or the like filled therein.

Here, the heat retention block 3 does not necessarily have to be laminated with the first heat retention block 3a and the second heat retention block 3b. For example, the heat retention block 3 may be constituted by any one of the first heat retention block 3a or the second heat retention block 3b having the same thickness as the heat retention block 3.

However, by configuring the heat retention block 3 to have a two-layer structure of the first heat retention block 3a and the second heat retention block 3b, the inorganic fiber 32 used in the first heat retention block 3a and the second heat retention block 3b can be made different. For example, biosoluble fiber having a high heat retention effect can be filled as the inorganic fiber 32 used in the first heat retention block 3a that covers the surface 21 of the turbine casing main body 2 where heat retention effects are more desired. On the other hand, as the inorganic fiber 32 used in the second heat retention block 3b, low cost rock wool, which has a lower heat retention effect than biosoluble fiber, can be filled to ensure a balance between heat retention and cost.

An insertion hole 34 is formed in each of the first bag body 31a and the second bag body 31b. The position of the insertion hole 34 of the second bag body 31b corresponds to the position of the insertion hole 34 of the first bag body 31a. The first heat retention block 3a and the second heat retention block 3b include the insertion hole 34 of the first bag body 31a and the insertion hole 34 of the second bag body 31b, and a through hole is formed through the first heat retention block 3a and the second heat retention block 3b.

Here, it is not necessary that the through holes that penetrate the first heat retention block 3a and the second heat retention block 3b is formed. However, by forming the through holes, it is easy to perform a penetrating operation of the securing rod 41 as the securing tool 4 described below through the first heat retention block 3a and the second heat retention block 3b.

The reinforcing member 33 is, for example, expanded metal having a staggered metal surface formed thereon, or punched metal having round mesh formed thereon.

Here, it is not necessary to intervene the reinforcement member 33 between the first heat retention block 3a and the second heat retention block 3b. However, in a case where the first heat retention block 3a and the second heat retention block 3b are secured by sewing alone, shear deformation can occur between the first heat retention block 3a and the second heat retention block 3b, and the laminated state of the first heat retention block 3a and the second heat retention block 3b may not be held for a long period of time. Therefore, the reinforcing member 33 is preferably interposed from the perspective of preventing shear deformation of the first heat retention block 3a and the second heat retention block 3b and holding the laminated state for a long period of time.

The first heat retention block 3a and the second heat retention block 3b are laminated in a state shifted in the shearing direction so that a portion thereof protrudes outward so as to have protrusion portions 35 and 35.

Here, it is not necessary that the first heat retention block 3a and the second heat retention block 3b are laminated so as to have the protrusion portions 35 and 35. The four sides of the first heat retention block 3a and the four sides of the second heat retention block 3b may be laminated so as to overlap with each other. However, in a case where the first heat retention block 3a and the second heat retention block 3b are laminated so as to have the protrusion portion 35, when a plurality of heat retention blocks 3 are disposed in the circumferential direction of the turbine casing main body 2, the gaps formed between adjacent heat retention blocks 3 are stepped, so heat dissipation from the turbine casing main body 2 can be reduced. Thus, in a case where the first heat retention block 3a and the second heat retention block 3b are laminated so as to have the protrusion portion 35, the heat retention effect can be increased.

The respective heat retention blocks 3 configured in this manner are disposed on the surface 21 of the turbine casing main body 2, and a fabric tape 36 is attached to the gaps formed between the adjacent heat retention blocks 3.

Here, it is not necessary that the fabric tape 36 be adhered to the gaps formed between the adjacent heat retention blocks 3. However, by attaching the fabric tape 36, heat dissipation from the gaps formed between the adjacent heat retention blocks 3 can be prevented and heat retention can be increased.

The securing tool 4 secures the heat retention block 3 to the turbine casing main body 2. The securing tool 4 includes a securing rod 41 and a socket 42 welded and fixed to the surface 21 of the turbine casing main body 2.

Figure 2A:
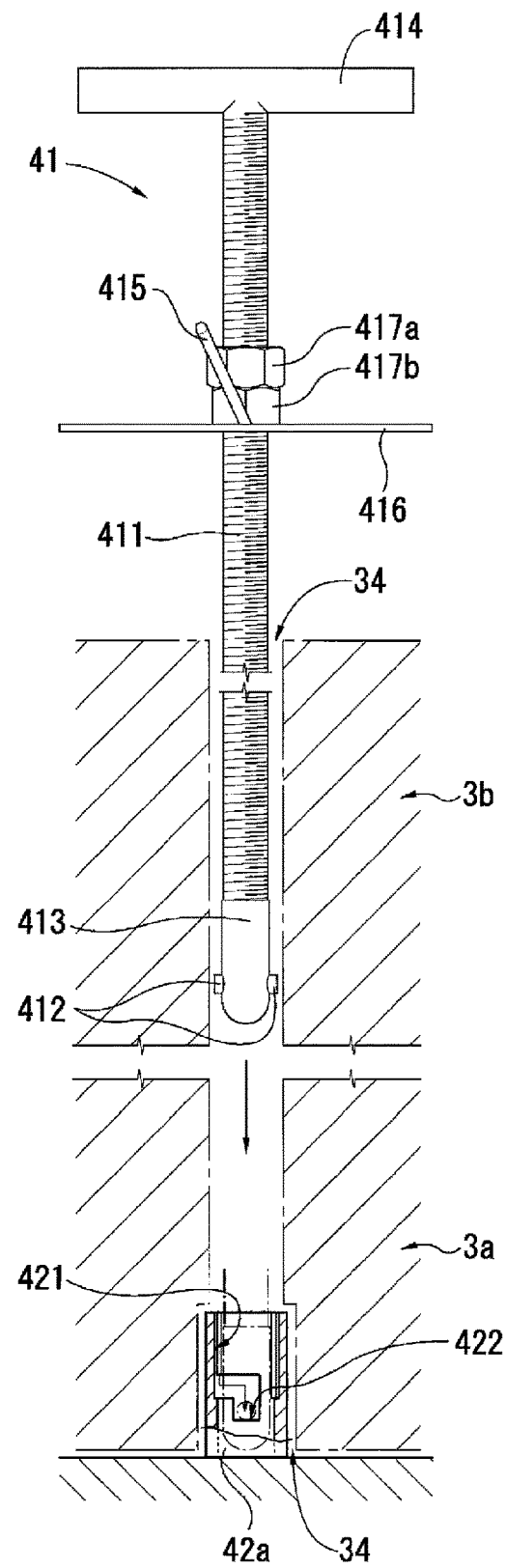
FIG. 2A is a notch side view of a main portion of a securing tool according to the embodiment of the present invention.
Figure 2B:
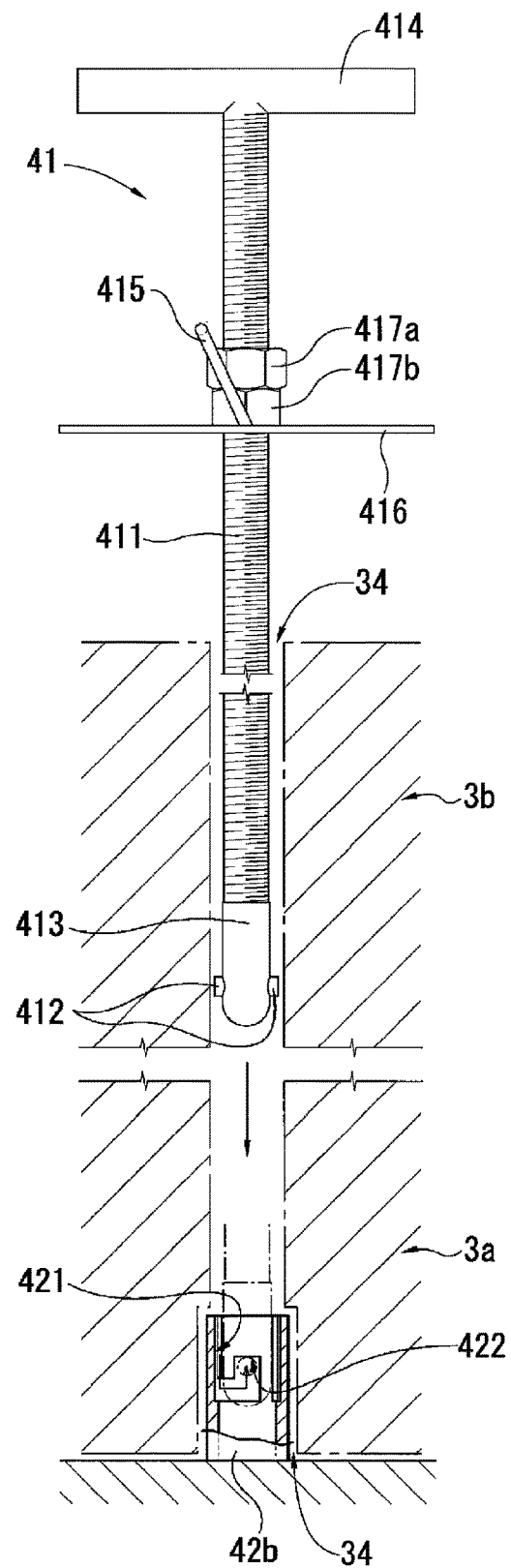
FIG. 2B is a notch side view of a main portion of another securing tool according to the embodiment of the present invention.

As illustrated in FIG. 1 and FIGS. 2A and 2B, the securing rod 41 includes a rod-shaped main body portion 411, an engaging portion 413 formed on a first end of the main body portion 411 and engaged with the socket 42, and a handle 414 formed on a second end of the main body portion 411 for operating the securing rod 41 by a worker. The main body portion 411 is a rod-shaped body that can penetrate into the insertion hole 34 of the second heat retention block 3b and the insertion hole 34 of the second heat retention block 3b. A male thread is formed on the outer circumference of the main body portion 411. The engaging portion 413 includes a substantially cylindrical shaft portion and a pair of protrusions 412 protruding outward from the shaft portion in the radial direction with respect to the rod-shaped main body portion 411.

Here, it is not necessary for the second end of the main body portion 411 to have the handle 414. However, by including the handle 414, the rotating operation and the like when securing the securing rod 41 to the socket 42, which will be described later, can be facilitated, and the burden on the worker can be reduced.

The securing rod 41 further includes a grip portion 415, a nut 417b, a flange 416 joined to the nut 417b, and a nut 417a. The grip portion 415 is configured to crimp the heat retention block 3 from the surface of the second heat retention block 3b in a state in which the main body portion 411 penetrates into the heat retention block 3. The nut 417b is screwed into the male thread of the main body portion 411. The nut 417a is screwed into the main body portion 411 to adjust the position of the flange 416 joined to the nut 417b with respect to the main body portion 411.

Here, it is not necessary for the securing rod 41 to include the flange 416. However, by including the flange 416, the heat retention block 3 can be pressed against the turbine casing main body 2, so the securing of the heat retention block 3 to the turbine casing main body 2 can be made stronger.

Figure 3A:
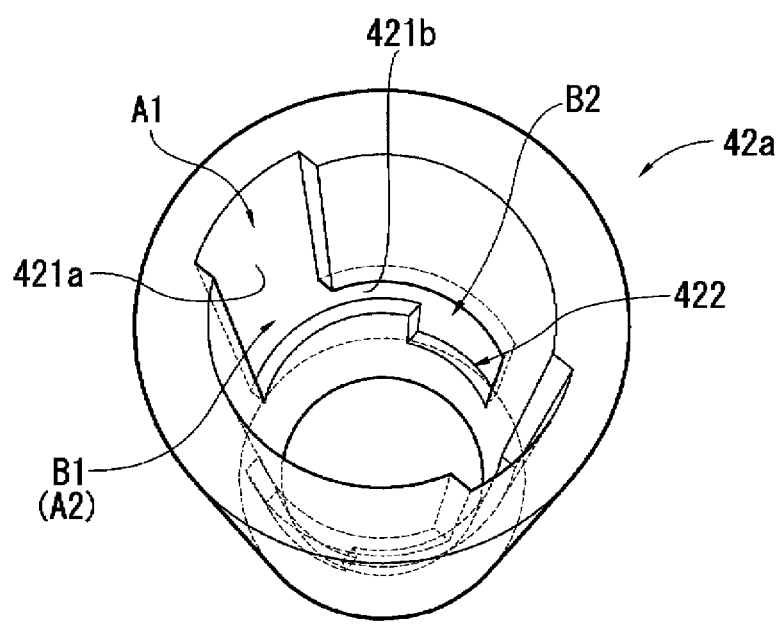
FIG. 3A is a perspective view of a socket according to the embodiment of the present invention.
Figure 3B:
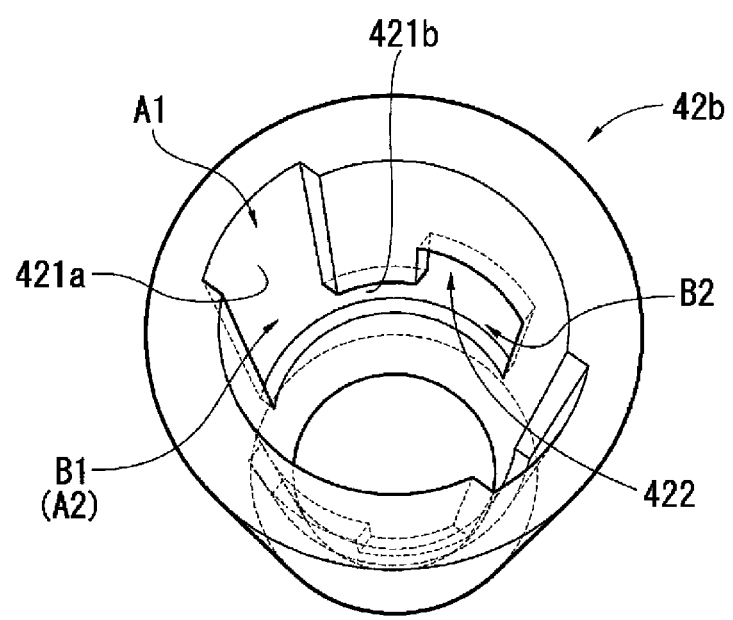
FIG. 3B is a perspective view of another socket according to the embodiment of the present invention.
Figure 4A:
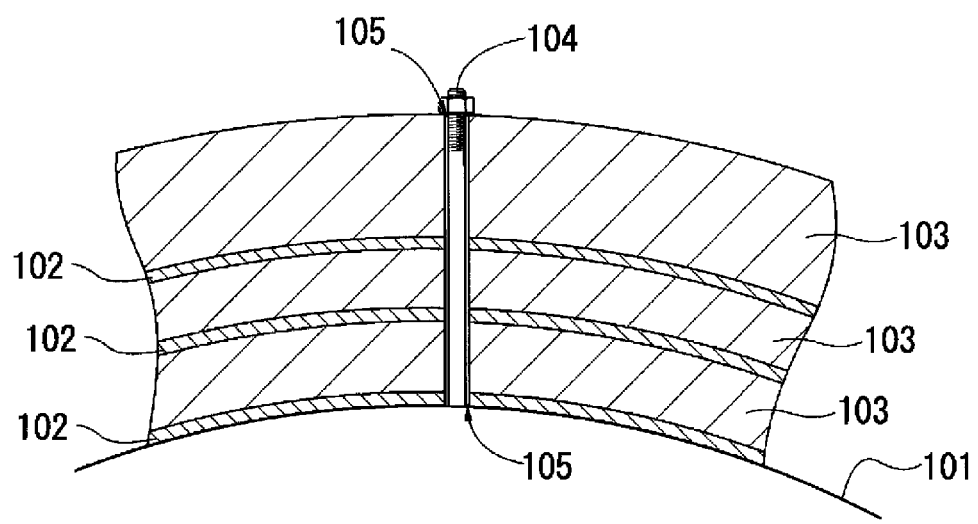
FIG. 4A is a cross-sectional view of a conventional heat retention structure.
Figure 4B:
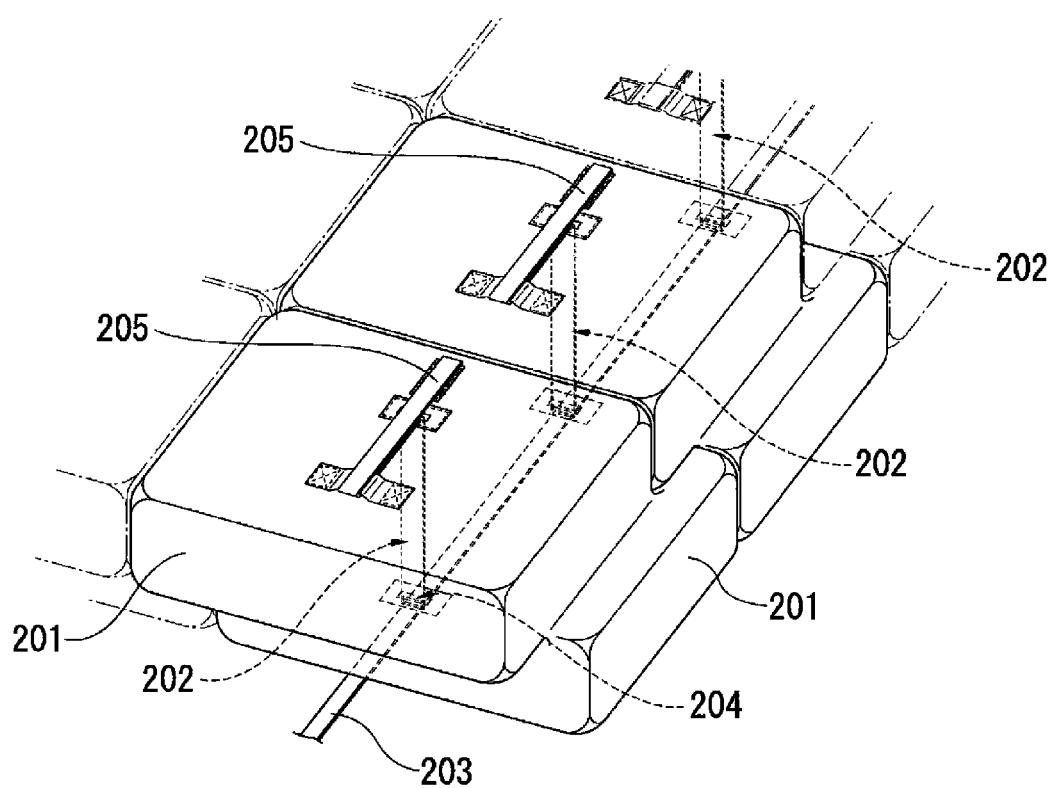
FIG. 4B is a perspective view of another conventional heat retention structure.

As the socket 42, a socket 42a configured as illustrated in FIG. 2A and FIG. 3A, and a socket 42b configured as illustrated in FIG. 2B and FIG. 3B can be considered. Each of the sockets 42a and 42b has a hollow cylindrical shape centered on the socket axis. Here, the direction in which the socket axis extends is referred to as an axial direction. A first side in the axial direction of the hollow cylindrical sockets 42a and 42b is open. A second side in the axial direction of the hollow cylindrical sockets 42a and 42b is sealed. On the inner circumferential surface of each of the sockets 42a and 42b, a guide groove 421 with which the protrusion 412 of the securing rod 41 can engage, and a recessed groove 422 leading to the guide groove 421 for holding the protrusion 412 in the locked position are formed.

The detailed structures of the guide groove 421 and the recessed groove 422 will be described with reference to FIGS. 3A and 3B. The guide groove 421 is formed to be recessed from the inner circumferential surface of the sockets 42a and 42b toward the outer circumferential side to engage with the pair of protrusions 412 of the securing rod 41. The guide groove 421 includes a first guide groove 421a and a second guide groove 421b. The first guide groove 421a includes a first starting end A1 in an open end of the sockets 42a and 42b and a first terminal end B1. The first guide groove 421a extends in the axial direction where the socket axis extends from the first starting end A1 to the first terminal end B1. The second guide groove 421b includes a second starting end A2 leading to the first terminal end B1 and a second terminal end B2. The second guide groove 421b extends in the circumferential direction where the socket axis from the second starting end A2 to the second terminal end B2.

Similar to the guide groove 421, the recessed groove 422 is formed to be recessed from the inner circumferential surface of each of the sockets 42a and 42b toward the outer circumferential side so as to engage the pair of protrusions 412 of the securing rod 41. This recessed groove 422 leads to the second terminal end B2 of the second guide groove 421b and extends in the axial direction. Note that the recessed groove 422 of the socket 42a of the specifications illustrated in FIG. 2A and FIG. 3A leads to the second terminal end B2 of the second guide groove 421b, and extends from the second terminal end B2 to the sealed end side, that is, to the side of the turbine casing main body 2. The recessed groove 422 of the socket 42b configured as illustrated in FIG. 2B and FIG. 3B leads to the second terminal end B2 of the second guide groove 421b and extends from the second terminal end B2 to the open end side of the socket 42b. Which of the socket 42a and the socket 42b with different specifications are used is selected depending on whether the socket is disposed in the upper turbine casing main body 2 or the socket is disposed in the lower turbine casing main body 2.

For example, as a socket disposed in the upper turbine casing main body 2 of the turbine casing main body 2 divided in the vertical direction, the socket 42a in which the recessed groove 422 extends toward the turbine casing main body 2 is used. For the socket 42a disposed in the upper turbine casing main body 2, the securing rod 41 is inserted from the vertically upward direction toward the downward direction. In a state in which the securing rod 41 is inserted into the socket 42a, a force to the upper turbine casing main body 2 side acts on the securing rod 41 by the effect of gravity. The recessed groove 422 of the socket 42a extends from the second terminal end B2 of the second guide groove 421b toward the upper turbine casing main body 2 side. Thus, the engaging state of the protrusion 412 of the securing rod 41 to the recessed groove 422 is not likely to be released.

On the other hand, as a socket disposed in the lower turbine casing main body 2 of the turbine casing main body 2 divided in the vertical direction, the socket 42b is used in which the recessed groove 422 is formed toward the open end side. For the socket 42b disposed in the lower side of turbine casing main body 2, the securing rod 41 is inserted from the vertically downward direction toward the upward direction. In a state in which the securing rod 41 is inserted into the socket 42b, a force acts on the securing rod 41 in a direction away from the lower turbine casing main body 2 due to the effect of gravity. The recessed groove 422 of the socket 42b extends in a direction away from the lower turbine casing main body 2, which is the open end side of the socket 42b from the second terminal end B2 of the second guide groove 421b. Thus, the engaging state of the protrusion 412 of the securing rod 41 to the recessed groove 422 is not likely to be released.

Next, a method of securing the heat retention block 3 to the turbine casing main body 2 will be described.

Installing Step of Heat Retention Block

First, in the retention block 3, the first heat retention block 3a is placed on the surface 21 of the turbine casing main body 2 so that the rear surface (other surface) of the first heat retention block 3a is in contact with the surface 21.

Position Adjusting Step

In the step of installing the heat retention block 3, when the heat retention block 3 is placed on the surface 21 of the turbine casing main body 2, the position of the heat retention block 3 is adjusted so that the socket 42 disposed on the surface 21 of the turbine casing main body 2 fits into the insertion hole 34 formed in the rear surface (other surface) of the first bag body 31a of the first heat retention block 3a.

Penetrating Step

In the adjusting step, when the positioning of the heat retention block 3 on the surface 21 of the turbine casing main body 2 is completed, the front surface side of the second bag body 31b of the second heat retention block 3b is temporarily held with one hand of the worker, and in this state the securing rod 41 is inserted into the heat retention block 3 from the engaging portion 413 side including the protrusion 412 in the insertion hole 34 formed in the second bag body 31b of the second heat retention block 3b with the other hand, and the securing rod 41 is penetrated into the heat retention block 3. Then, the protrusion 412 of the securing rod 41 is inserted into the first guide groove 421a from the first starting end A1 of the socket 42.

Flange Pressing Step

In the inserting step, the position of the flange 416 is adjusted so that the nuts 417a and 417b are screwed into the main body portion 411 of the securing rod 41 in a state that the securing rod 41 is inserted into the heat retention block 3 so that the heat retention block 3 is pressed by the flange 416.

Pressing Step

When the engaging state of the first starting end A1 and the protrusion 412 is confirmed, the securing rod 41 is pressed. With this pressing operation, the protrusion 412 of the securing rod 41 slides until the protrusion abuts the first terminal end B1 while being guided by the first guide groove 421a of the socket 42.

Rotating Step

The pressing step rotates the securing rod 41 to one side in the circumferential direction (clockwise or counterclockwise) with respect to the socket axis once the abutting of the protrusion 412 to the first terminal end B1 is confirmed. With this rotating operation, the protrusion 412 in the first guide groove 421a is inserted from the second starting end A2 of the socket 42 into the second guide groove 421b and slides until the protrusion abuts the second terminal end B2 while being guided by the second guide groove 421b.

Engaging Step

The rotating operation step causes the securing rod 41 to be pressed or pulled once the abutting of the protrusion 412 to the second terminal end B2 is confirmed. This pushing or pulling operation causes the protrusion 412 of the securing rod 41 to engage with the recessed groove 422 recessed from the second terminal end B2. This completes the locking of the securing rod 41 to the socket 42.

For example, as described above, the recessed groove 422 of the socket 42a disposed in the upper turbine casing main body 2 of the turbine casing main body 2 divided in the vertical direction extends from the second terminal end B2 toward the turbine casing main body 2 in the axial direction. Thus, when the abutting of the protrusion 412 to the second terminal end B2 is confirmed, the protrusion 412 can be engaged with the recessed groove 422 by pressing the securing rod 41.

On the other hand, as described above, the recessed groove 422 of the socket 42b disposed in the lower turbine casing main body 2 of the turbine casing main body 2 divided in the vertical direction extends from the second terminal end B2 to the open end side of the socket 42b in the axial direction. Thus, when the abutting of the protrusion 412 to the second terminal end B2 is confirmed, the protrusion 412 can be engaged with the recessed groove 422 by pulling the securing rod 41.

As described above, with the heat retention device for the turbine casing according to the present embodiment, it is possible to easily and quickly install and remove the turbine casing of a turbine power generator used in a power plant or the like, and the heat retention device can be used repeatedly.

INDUSTRIAL APPLICABILITY

In one aspect of the present invention, the heat retention device can be installed easily and quickly on the turbine casing, and the heat retention device can be used repeatedly.

REFERENCE SIGNS LIST

1 Heat retention device
2 Turbine casing main body
21 Surface
3 Heat retention block
3a First heat retention block
3b Second heat retention block 31a First bag body
31b Second bag body
32 Inorganic fiber
33 Reinforcing member
34 Insertion hole
35 Protrusion portion
36 Fabric tape
4 Securing tool
41 Securing rod
411 Main body portion
412 Protrusion
413 Engaging portion
414 Handle
415 Grip portion
416 Flange
417a, 417b Nut
42, 42a, 42b Socket
421 Guide groove
421a First guide groove
421b Second guide groove
422 Recessed groove
A1 First starting end
A2 Second starting end
B1 First terminal end
B2 Second terminal end

The invention claimed is:

1. A method for securing a heat retention block for a turbine casing, the method comprising the steps of:
    installing a heat retention block on a turbine casing main body;
    adjusting a position of the heat retention block with respect to a socket disposed on a surface of the turbine casing main body, the socket having a hollow cylindrical shape centered on a socket axis, and the socket including an open end at an end on a first side in an axial direction where the socket axis extends;
    penetrating a securing rod including an engaging portion through the heat retention block;
    pressing the securing rod to fit the engaging portion within the socket;
    rotating the securing rod in a circumferential direction with respect to the socket axis; and
    engaging the engaging portion with the socket, wherein
    the heat retention block includes a bag body including an insertion hole formed in a predetermined position and inorganic fiber filled into the bag, and has a thickness from one surface side to another surface side,
    the securing rod includes a rod-shaped main body portion, and the engaging portion including a pair of protrusions formed on a first end of the main body portion and protruding outward in a radial direction with respect to the rod-shaped main body portion,
    the socket includes a first guide groove, a second guide groove, and a recessed groove recessed from an inner circumferential surface of the socket toward an outer circumferential side and formed so that the protrusion is inserted,
    the first guide groove includes a first starting end in the open end and a first terminal end, and extends in an axial direction from the first starting end to the first terminal end,
    the second guide groove includes a second starting end leading to the first terminal end and a second terminal end, and extends in a circumferential direction with respect to the socket axis from the second starting end to the second terminal end,
    the recessed groove leads to the second terminal end and extends in the axial direction from the second terminal end,
    in the step of installing, the other surface side of the heat retention block is brought into contact with a surface of the turbine casing main body,
    in the step of adjusting, the position of the heat retention block is adjusted to fit the socket into an insertion hole formed at a predetermined position on the other surface side of the heat retention block,
    in the step of pressing, the protrusion is inserted into the first guide groove from the first starting end of the first guide groove, and the securing rod is pressed to the first terminal end of the first guide groove,
    in the step of rotating, the protrusion in the first guide groove is inserted into the second guide groove from the second starting end of the second guide groove, and the securing rod is rotated in the circumferential direction to the second terminal end of the second guide groove, and
    in the step of engaging, the protrusion in the second guide groove is placed in the recessed groove.

2. The method for securing the heat retention block for the turbine casing according to claim 1, wherein the engaging step includes a step of pressing the securing rod in the axial direction from the second terminal end.

3. The method for securing the heat retention block for the turbine casing according to claim 1, wherein the engaging step includes a step of pulling the securing rod in the axial direction from the second terminal end.

4. A heat retention device for a turbine casing, the heat retention device comprising:
    a heat retention block disposed on a surface of a turbine casing main body;
    a securing rod capable of penetrating the heat retention block in a thickness direction; and
    a socket secured to the surface of the turbine casing main body, wherein the heat retention block includes a bag body including an insertion hole formed in a predetermined position and inorganic fiber filled into the bag body, and the heat retention block is formed so as to have a thickness from one surface side to the other surface side,
    the securing rod includes a rod-shaped main body portion inserted into the heat retention block from the insertion hole and penetrating the heat retention block in a thickness direction, and an engaging portion including a pair of protrusions formed on a first end of the main body portion and protruding outward in a radial direction with respect to the rod-shaped main body portion,
    the socket has a hollow cylindrical shape centered on a socket axis, and an end of a first side in an axial direction where the socket axis extends forms an open end,
    the socket includes a first guide groove, a second guide groove, and a recessed groove recessed from an inner circumferential surface of the socket toward an outer circumferential side and formed for receiving the protrusion,
    the first guide groove includes a first starting end in the open end and a first terminal end, and extends in an axial direction from the first starting end to the first terminal end,
    the second guide groove includes a second starting end leading to the first terminal end and a second terminal end, and extends in a circumferential direction with respect to the socket axis from the second starting end to the second terminal end, the recessed groove leads to the second terminal end and extends in the axial direction from the second terminal end, the other surface side of the heat retention block contacts with the surface of the turbine casing main body, and a position of the heat retention block is adjusted so as to fit the socket into an insertion hole formed at a predetermined position on the other surface side of the heat retention block.

\* \* \* \* \*